US 9,039,801 B2

(12) United States Patent
Gorman

(10) Patent No.: US 9,039,801 B2
(45) Date of Patent: May 26, 2015

(54) FILTER HOLDING FRAME WITH FILTER GASKET

(71) Applicant: CAMFIL FARR, INC., Riverdale, NJ (US)

(72) Inventor: Joseph J. Gorman, Sussex, NJ (US)

(73) Assignee: Camfil USA, Inc., Riverdale, NJ (US)

( * ) Notice: Subject to any disclaimer, the term of this patent is extended or adjusted under 35 U.S.C. 154(b) by 92 days.

(21) Appl. No.: 13/871,851

(22) Filed: Apr. 26, 2013

(65) Prior Publication Data

US 2013/0291502 A1 Nov. 7, 2013

Related U.S. Application Data

(60) Provisional application No. 61/641,263, filed on May 1, 2012.

(51) Int. Cl.
| | |
|---|---|
| *B01D 46/00* | (2006.01) |
| *F16L 23/16* | (2006.01) |
| *F16J 15/10* | (2006.01) |
| *F16J 15/06* | (2006.01) |
| *B01D 46/10* | (2006.01) |

(52) U.S. Cl.
CPC ............. *B01D 46/0005* (2013.01); *F16L 23/16* (2013.01); *F16J 15/104* (2013.01); *F16J 15/062* (2013.01); *B01D 46/10* (2013.01); *B01D 2271/02* (2013.01)

(58) Field of Classification Search
CPC ........... B01D 46/0005; B01D 2271/02; B01D 2271/022; B01D 2271/025; F16J 15/062; F16J 15/104
USPC ............. 55/502, DIG. 31; 277/616, 626, 637, 277/641, 642, 647

See application file for complete search history.

(56) References Cited

U.S. PATENT DOCUMENTS

| | | | |
|---|---|---|---|
| 3,058,279 A | 10/1962 | Metcalfe | |
| 3,873,266 A | 3/1975 | Hofer et al. | |
| 3,873,286 A * | 3/1975 | Wurtenberg | .................... 55/378 |
| 4,373,635 A | 2/1983 | Mules | |
| 2003/0177745 A1 | 9/2003 | Jauw | |
| 2005/0169813 A1 | 8/2005 | D'Amico et al. | |
| 2007/0294988 A1 | 12/2007 | Miller et al. | |

OTHER PUBLICATIONS

PCT international search report and written opinion of PCT/US2013/038671 dated Sep. 27, 2013.

* cited by examiner

*Primary Examiner* — Robert Clemente
(74) *Attorney, Agent, or Firm* — Patterson & Sheridan, LLP

(57) ABSTRACT

In one embodiment, a filter holding frame assembly includes a frame having a plurality of walls forming a quadrilateral ring and a gasket. The frame has a plurality of flanges, and each flange is coupled to a respective one of the walls and extends into the ring. The gasket has a connection portion coupled to a sealing portion. The connection portion has a substantially u-shaped cross-section coupled to the flange. The sealing portion has a flexible sealing element that extends away from the connection portion. In another embodiment, a gasket includes a connection portion coupled to a sealing portion. The connection portion has a substantially u-shaped cross-section configured to receive a filter holding frame and includes a bottom. The sealing portion comprises a first flexible sealing element that extends outwards from the connection portion. The bottom of the connection portion does not extend to the end of the sealing portion.

17 Claims, 11 Drawing Sheets

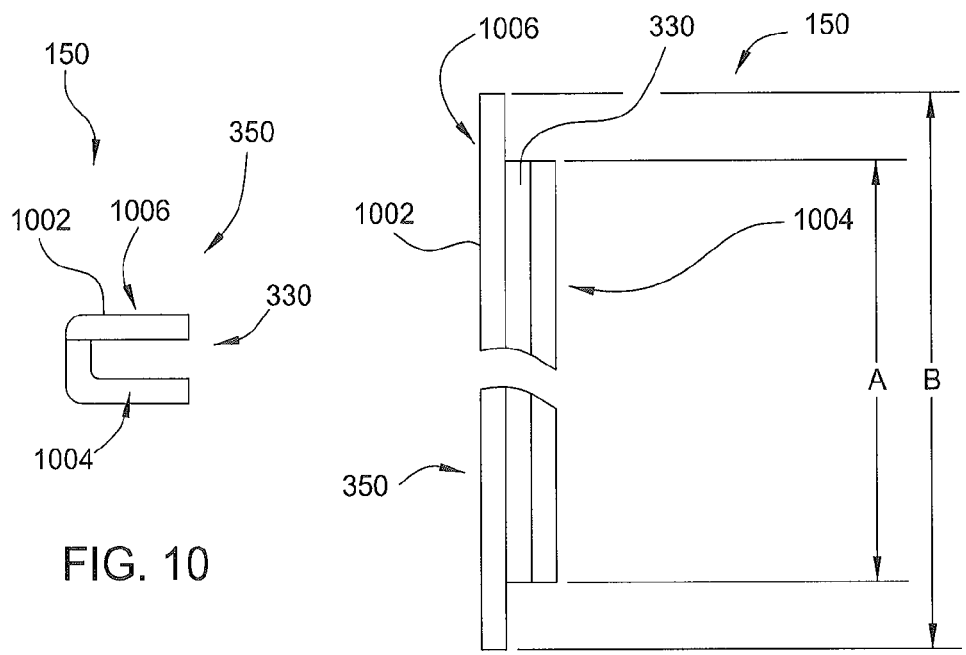
FIG. 10
FIG. 11
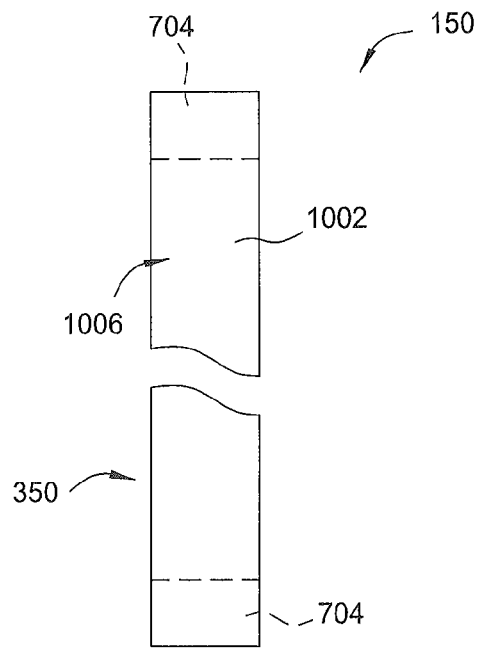
FIG. 12

FILTER HOLDING FRAME WITH FILTER GASKET

CROSS-REFERENCE TO RELATED APPLICATION

This application claims benefit of the U.S. Provisional Patent Application No. 61/641,263 filed May 1, 2012 which is herein incorporated by reference in its entirety.

BACKGROUND OF THE INVENTION

1. Field of the Invention

Embodiments described herein generally relate to filter holding frame assemblies and gaskets for the same that are suitable for use in air handling systems.

2. Description of the Related Art

Air filtration systems typically utilize filter holding frames, interchangeably referred to as "holding frames", to secure various combinations of pre-filtration and final filtration elements in an air handling system. Filter holding frames, such as Type 8 holding frames available from Camfil Farr, Inc., of Riverdale, N.J., may be used with a variety of fasteners to allow the installation of the various combinations of pre-filtration and final filtration elements. Typically, the fasteners may include any combination of clips, clamps, springs, wires, and/or brackets.

Depending on the amount of by-pass tolerable for a specific filtration application, one of the filter holding frame or filtration elements will include a gasket. In applications in which the gaskets are attached to the individual filters, the gasket increases the unit costs of the filters. Since the filters are periodically replaced, the additional gasket undesirable increases the cost of the filter. In applications in which the gaskets are attached to the holding frame, the gaskets become worn and ineffective over time, thus requiring costly and laborious replacement.

Thus, there is a need for an improved filter gasket for use with holding frames.

SUMMARY OF THE INVENTION

Embodiments described herein generally relate to filter holding frame assemblies and gaskets for the same that are suitable for use in air handling systems. In one embodiment, a filter holding frame assembly includes a filter holding frame and a gasket. The filter holding frame has a plurality of walls forming a quadrilateral ring defined around a central aperture of the filter holding frame. The filter holding frame has a plurality of flanges, and each flange is coupled to a respective one of the walls and extends into the ring. A gasket is coupled to each of the flanges. The gasket has a connection portion coupled to a sealing portion, and the connection portion has a substantially u-shaped cross-section coupled to the flange. The sealing portion has a first flexible sealing element that extends away from the connection portion and into the central aperture.

In another embodiment, a filter gasket is provided. The filter gasket includes a connection portion coupled to a sealing portion and forms a unitary strip. The connection portion has a substantially u-shaped cross-section configured to receive a filter holding frame. The substantially u-shaped cross-section includes a first side, a second side and a bottom. The bottom of the u-shaped cross-section includes a slot configured to couple the gasket with a neighboring filter holding frame flange. The sealing portion comprises a first flexible sealing element that extends beyond the slot in the bottom of the u-shaped cross-section.

In another embodiment, a filter gasket kit is provided that includes four first elongated gasket strips and packaging securing the four first elongated gasket strips. Each of the gasket strips includes a connection portion coupled to a sealing portion and forms a unitary strip. The connection portion has a substantially u-shaped cross-section configured to receive a filter holding frame. The substantially u-shaped cross-section includes a first side, a second side and a bottom. The bottom of the u-shaped cross-section includes a slot configured to couple the gasket with a neighboring filter holding frame flange. The sealing portion comprises a first flexible sealing element that extends beyond the slot in the bottom of the u-shaped cross-section.

In yet another embodiment, a filter gasket is provided. The filter gasket includes a connection portion coupled to a sealing portion and forms a unitary strip. The connection portion has a substantially u-shaped cross-section configured to receive a filter holding frame. The substantially u-shaped cross-section includes a first side, a second side and a bottom. The sealing portion comprises a first flexible sealing element that extends outwards from the connection portion. The bottom of the connection portion does not extend to the end of the sealing portion. The sealing portion has a length greater than the first side of the connection portion, and the first side of the connection portion faces the sealing portion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 is a top view of a filter gasket according to one embodiment of the invention;

FIG. 11 is a top view of a filter gasket according to one embodiment of the invention;

FIG. 12 is a side view of a filter gasket according to one embodiment of the invention;

To facilitate understanding, identical reference numerals have been used, wherever possible, to designate identical elements that are common to the figures. It is contemplated that elements of one embodiment may be beneficially incorporated in other embodiments without further recitation.

DETAILED DESCRIPTION

Figure 1:
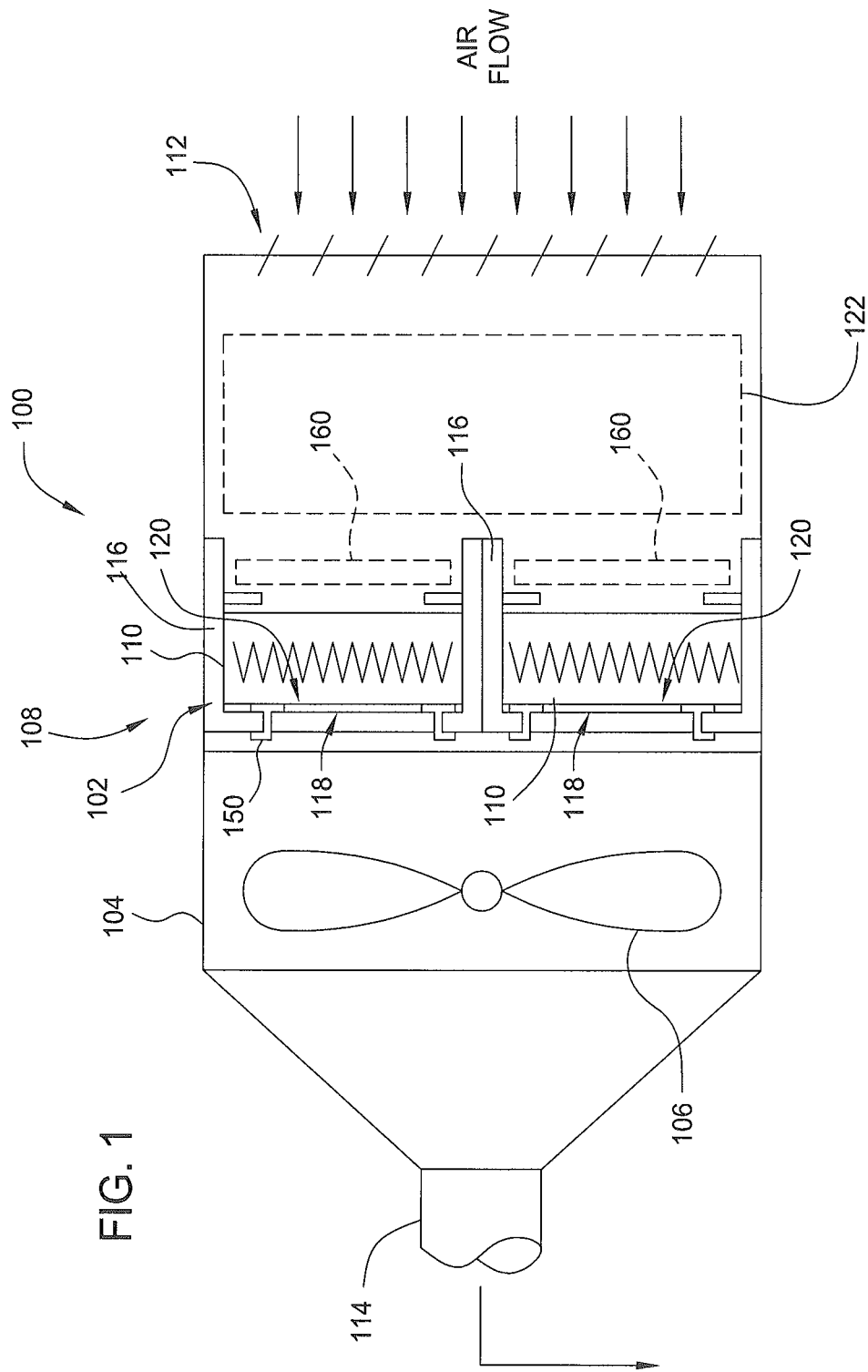
FIG. 1 is a schematic sectional view of an air handler having a holding frame assembly, according to one embodiment of the invention.

FIG. 1 is a schematic sectional view of an air handler 100 having a holding frame assembly 102. Although the holding frame assembly 102 is shown mounted inside the air handler 100, it is contemplated that the holding frame assembly 102 may be utilized advantageously in or associated with air ducts or other portion of a heating ventilation and air conditioning (HVAC) system.

For the sake of discussion, embodiments of the invention are described in relation to a direction of air flow, for example, such as the air flow shown in FIG. 1 through the holding frame assembly 102 and air handler 100. Further, the terms "upstream" and "downstream" may be used herein to describe the arrangement and configuration of components of embodiments of the invention relative to such a directional air flow (e.g., "downstream side"). However, it is contemplated that embodiments of the invention may be configured to be suitable for use with a "reversed" or opposite direction of air flow. As such, it is understood that such terms as "downstream" or "upstream" do not in any way limit or restrict embodiments of the invention or manners in which embodiments of the invention may be utilized, but rather, provide clarification for the arrangement and configuration of said components relative to one exemplary direction of air flow.

The air handler 100 generally includes a housing 104 which contains a blower 106 and a filter bank 108 having one or more final filters 110 and optionally, one or more prefilters 160 (shown in phantom) mounted to the holding frame assembly 102. The housing 104 may include an access door 122 to facilitate replacement of the final filters 110 and/or prefilters 160. The blower 106 draws air into the housing 104 through a grate 112 and through the filter bank 108, exhausting the filtered air from the housing 104 into a conduit 114. The filtered air leaving the air handler 100 through the conduit 114 is typically routed to a facility or other location. Although the blower 106 is shown on the downstream side of the holding frame assembly 102, the blower 106 may alternatively be located in an upstream location.

The holding frame assembly 102 is sealingly coupled to the housing 104 and supports the one or more final filters 110 and optional prefilters 160 comprising the filter bank 108. The holding frame assembly 102 may be sealed to the housing 104 by welding, adhesive, caulking, gaskets, or other suitable method. Generally, the holding frame assembly 102 includes one or more holding frames 116, each having a central aperture 118 and configured to hold a single final filter 110 and associated prefilter 160. The number of holding frames 116 comprising the holding frame assembly 102 is selected to accommodate a predefined number of final filters 110 for which the air handler 100 was designed. The holding frames 116 are secured to each other in a grid pattern. In the embodiment depicted in FIG. 1, the holding frame assembly 102 includes a plurality of holding frames 116 arranged into a plurality of aperture rows 120 for supporting an upper and lower tier of final filters 110.

The holding frame assembly 102 also includes a filter gasket 150. The filter gasket 150 is configured to seal the final filter 110 against the holding frame 116.

A "filter element", as described herein, generally refers to any device or product that is used for the purpose of removing air particulate from the air stream. In one embodiment, the filter element comprises filter media housed within a filter frame. The filter media may be pleated to increase the surface area available for air passage and increase filtration efficiency of the filter element. The filter frame is generally comprised of three or more sides enclosing an open passage. The sides of the filter frame may have a C-shaped profile that accepts the edge of the filter media and may be fabricated from aluminum, sheet metal, plastic, paper (meaning to include paper-like products), wood or other suitable material. In the embodiment depicted in FIG. 1, the filter element has a quadrilateral form. In an alternative embodiment, as seen in FIGS. 12B-C, the filter element may have a trapezoidal form. In embodiments described herein, a filter element may refer to a final filter 110 or a prefilter 160.

In one embodiment, final filters 110 may be one of American Society of Heating Refrigeration and Air Conditioning Engineers (ASHRAE) rated or a Minimum Efficiency Reporting Value (MERV) rated filter, 95% DOP filter, a HEPA filter, or a filter of other efficiency. Other examples of final filters that may be utilized with embodiments of the invention include, but are not limited to, 1" deep panel or pleated filters, 2" deep panel or pleated filters, 4" deep panel or pleated filters, 6" or 12" deep rigid filters, header-style rigid or pocket filters and v-bank filters, among others. In one embodiment, the prefilters 160 may be ASHRAE-rated, MERV-rated, EN779-rated or other suitable first stage filters.

Figure 2A:
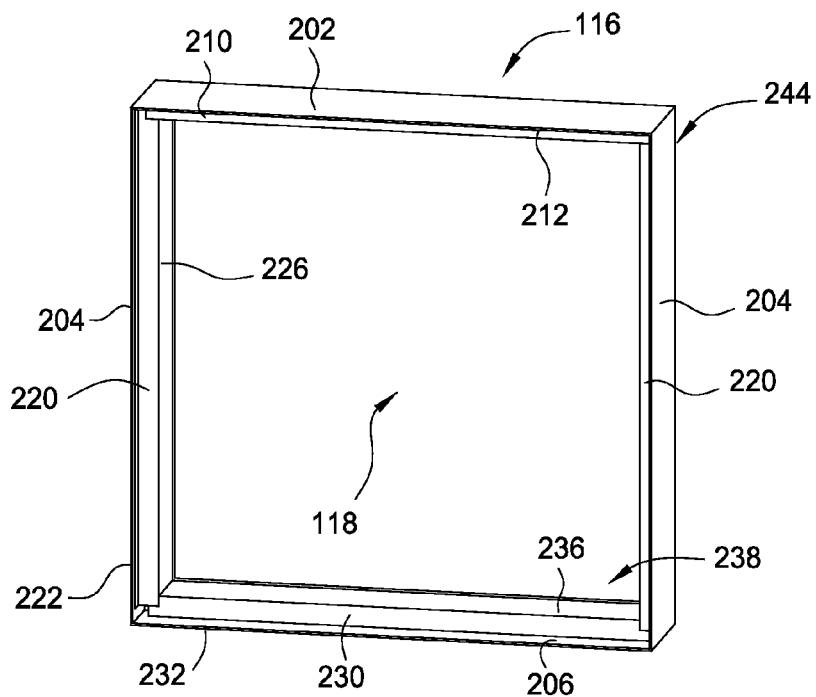
FIGS. 2A-2C depict a perspective view, a front plan view, and a partial perspective view, respectively, of the holding frame assembly of FIG. 1.
Figure 2B:
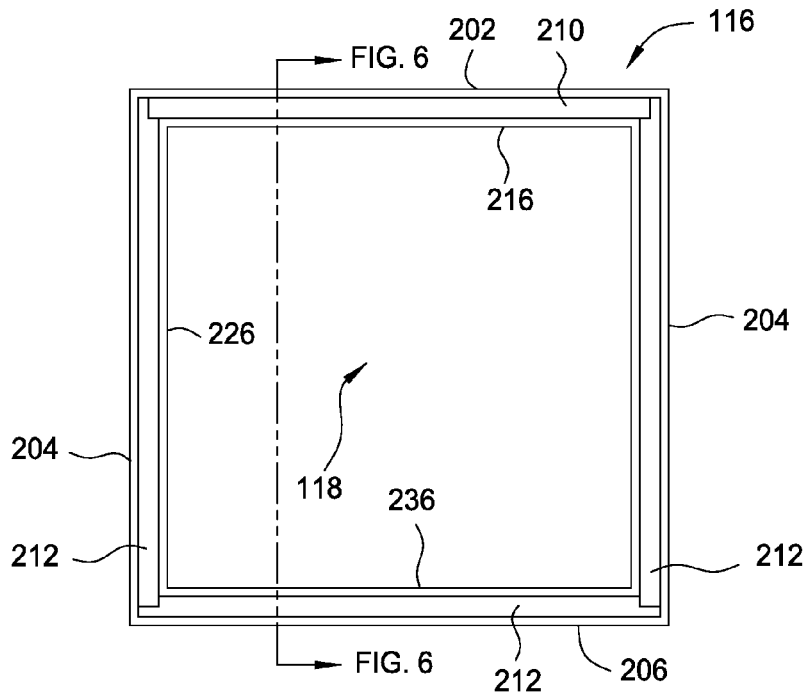

FIGS. 2A and 2B depict a perspective view and a front plan view, respectively, of the holding frame 116 of the holding frame assembly 102 of FIG. 1 without the filter gasket 150 to provide an uninterrupted view of the holding frame 116. The holding frame 116 includes four walls, e.g., a top wall 202, two side walls 204, and a bottom wall 206 that are coupled to form a quadrilateral ring bounding the central aperture 118. The top wall 202, side walls 204, and bottom wall 206 are parallel with the flow of air through the holding frame 116. In one embodiment, the top wall 202, side walls 204, and bottom wall 206 include open edges 212, 222, 232 that define the central aperture 118 of the holding frame 116. The walls 202, 204, 206 also include back flanges 216, 226, 236 that extend inward, for example 90 degrees, from the plane of the walls 202, 204, 206 to define an airflow outlet 244 of the holding frame 116. The walls 202, 204, 206 and back flanges 216, 226, 236 may be fabricated from a single or multiple elements.

The final filter 110 may be held in the holding frame 116 by any suitable article, including fasteners and conventional springs and clips. In one embodiment, the holding frame 116 includes at least one rigid retainer 210 and/or at least one flexible retainer 220, 230 configured to retain the final filter 110 within the holding frame 116 such that air flowing through the holding frame 116 must pass through the central aperture 118, the final filter 110 disposed therein, and the airflow outlet 244. The final filter 110 is engaged with the rigid retainer 210 first, end the final filter 110 is pushed past the deflected flexible retainer 220, 230. The flexible retainer 220, 230 then spring back to retain the filter against the holding frame 116 as further described below.

Figure 2C:
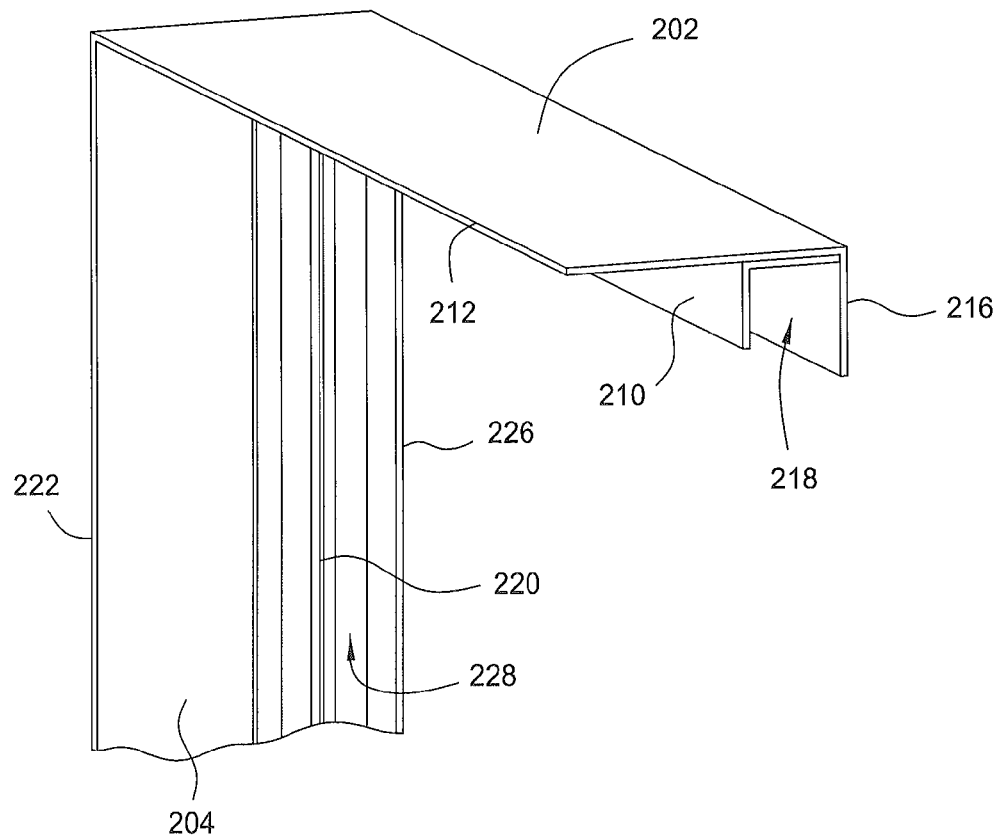

It is appreciated that, while FIGS. 2A-C depict one embodiment of the holding frame 116 having a rigid retainer 210 and three flexible retainers, various configurations of rigid retainer(s) and flexible retainer(s) may be used to secure a final filter 110 within the holding frame 116. It is appreciated that a configuration of the holding frame 116 may include various rigid retainer(s) and flexible retainer(s) interchanged, added, and/or subtracted. For example, one embodiment of the holding frame 116 may include two or more flexible retainers coupled to opposing walls of the holding frame 116 and no rigid retainers. In another example, an embodiment of the holding frame 116 may include a rigid retainer 210 coupled to one wall (e.g., top wall 202) and additional flexible retainers 220 may be coupled to adjacent walls (e.g., sidewalls 204). In yet another example, an embodiment of the holding frame 116 may include a rigid retainer 210 coupled to one wall (e.g., top wall) and a single flexible retainer 220 coupled to an opposing wall (e.g., bottom wall), with additional flexible retainers coupled to adjacent walls (e.g., side walls). Generally, only one flexible retainer 220, 230 may be needed when used with a rigid retainer 210, while at least two flexible retainers 220, 230 are used in embodiments where a rigid retainer 210 is not present. Accordingly, it is appreciated that discussion of the rigid retainer 210, particularly pertaining to positioning and arrangement of the rigid retainer 210 in the holding frame 116, may be extended to the flexible retainers 220, 230, and vice versa.

The rigid retainer 210 extends from at least one of the walls 202, 204, 206 into the central aperture 118 and is intended for use with at least one flexible retainer 220, 230. The rigid retainer 210 holds the final filter 110 within the holding frame 116 proximate the flanges 216, 226, 236 and airflow outlet 244. The rigid retainer 210 and the flanges 216, 226, 236 include parallel surfaces in a spaced apart relation that defines a pocket for receiving the final filter 110. The parallel surfaces are fixed in relation to each other when the rigid retainer 210 is secured to the least one of the walls 202, 204, 206.

In the embodiment shown in FIG. 2A-C, the rigid retainer 210 is coupled to the top wall 202 and extends from the top wall 202 into the central aperture 118. The rigid retainer 210 is spaced apart from the back flange 216 so as to define a rigid filter receiving pocket 218 configured to retain a side (e.g., a top side) of the final filter 110. The position of the rigid retainer 210 relative to the back flange 216 is selected to define the rigid filter receiving pocket 218 having a predetermined size. The height of the rigid retainer 210 is selected to allow the final filter 110 to be inserted into the rigid filter receiving pocket 218 at an angle relative to the holding frame 116. The rigid retainer 210 may have a length substantially spanning the top wall 202, or in an alternative embodiment, may include a plurality of segments disposed on the top wall 202. The rigid retainer 210 is shown in further detail in FIG. 3.

In one embodiment, the holding frame 116 may include one or more flexible retainers 220, 230 configured to retain the final filter 110 within the holding frame 116 such that air flowing through the holding frame 116 must pass through the central aperture 118, the final filter 110 disposed therein, and the airflow outlet 244. The one or more flexible retainers 220, 230 are coupled to at least one of the walls 202, 204, 206. The flexible retainers 220, 230 are configured to bend from an original position to permit insertion of the final filter 110 into the holding frame 116. The one or more flexible retainers 220, 230 have a resiliency sufficient to return to the original position and/or provide additional support of the final filter 110 within the holding frame 116. For example, in one embodiment, the flexible retainers 220, 230 may bend to allow the final filter 110 to pass over the flexible retainers and return to a position that retains the final filter 110. The one or more flexible retainers 220, 230 may be flexible enough to permit the final filter 110 to be pulled out when the final filter 110 is replaced.

In the embodiment shown in FIGS. 2A-C, two flexible retainers 220 and a flexible retainer 230 are coupled to opposing side walls 204 and the bottom wall 206, respectively, and extend from the side walls 204 and bottom wall 206 into the central aperture 118. The flexible retainers 220 may be spaced apart from the back flanges 226 of the side walls 204 so as to define a filter receiving pocket 228 for retaining sides (e.g., lateral sides) of a final filter 110. Similarly, the flexible retainer 230 may be spaced apart from the back flange 236 of the bottom wall 206 to define a flexible filter receiving pocket 238 for retaining a side (e.g., a bottom side) of a final filter 110. The rigid retainer 210 may have a length substantially spanning the top wall 202, or in an alternative embodiment, may include a plurality of segments disposed on the top wall 202.

According to one embodiment, to install a final filter 110 at a predefined position in the holding frame 116, a top end of the final filter 110 may be inserted into the rigid filter receiving pocket 218 at an angle relative to the holding frame 116. The final filter 110 may then be pivoted at the top end to rotate the final filter 110 into a vertical orientation within the holding frame 116. As the final filter 110 is rotated into the vertical position, the sides of the final filter 110 contact the flexible retainers 220, 230, causing the flexible retainers 220, 230 to bend and allow the final filter 110 to move past the retainer 220, 230 and into the filter receiving pockets 228, 238 of the side walls 204 and bottom wall 206. The shape and position of the flexible retainers 220, 230 may be selected to retain the sides of the final filter 110 when the final filter 110 is disposed within the filter receiving pockets 228, 238, as described below.

Referring back to FIG. 1, the filter gasket 150 is coupled to the holding frame 116 to provide a seal between the final filter 110 and holding frame 116. In one embodiment, the filter gasket 150 is fabricated at least partially from a resilient material suitable for providing a seal between the final filter 110 and the holding frame 116. In one embodiment, the filter gasket 150 is fabricated at least partially from an elastomer. In yet another embodiment, the filter gasket 150 may be fabricated at least partially from a rigid material suitable for providing a durable grip between the filter gasket 150 and the holding frame 116. The filter gasket 150 may be utilized to prevent bypass between the final filter 110 and the holding frame 116. Details of the filter gasket 150 in relation to the holding frame 116 will be described in detail further below with reference to FIGS. 6-8.

Figures 3, 4:
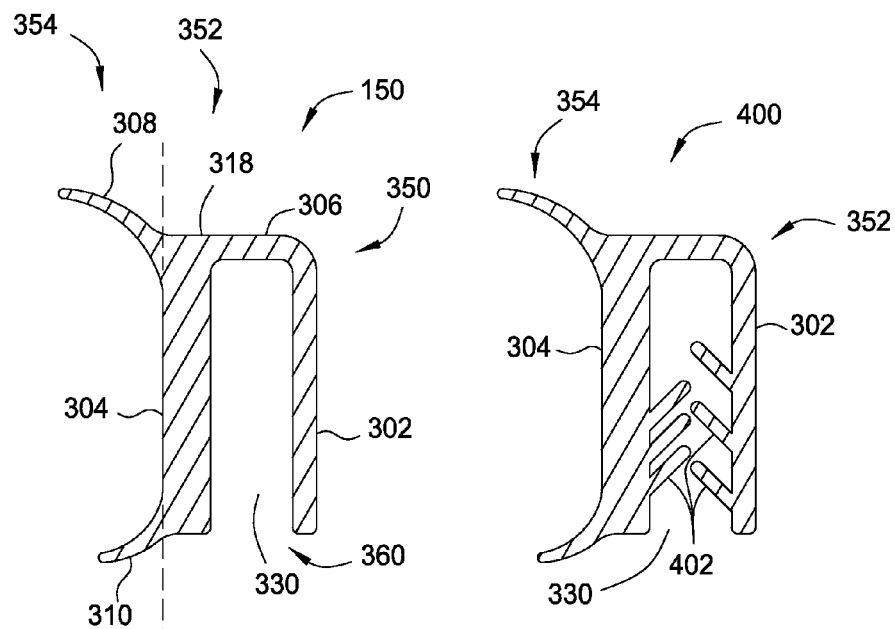
FIG. 3 is cross-sectional view of a filter gasket according to one embodiment of the invention.
FIG. 4 is a cross-sectional view of a filter gasket according to one embodiment of the invention.

FIG. 3 is one embodiment of the filter gasket 150. The filter gasket 150 may be fabricated from one or more gasket strips 350. For example, a single gasket strip 350 may be configured to circumscribe the entire aperture. In another embodiment, two filter strips 350 may be utilized each strip 350 covering adjacent flanges of the holding frame 116. In the embodiment depicted in FIG. 3, four gasket strips 350 are utilized to circumscribe the aperture of the holding frame 116.

Figure 5:
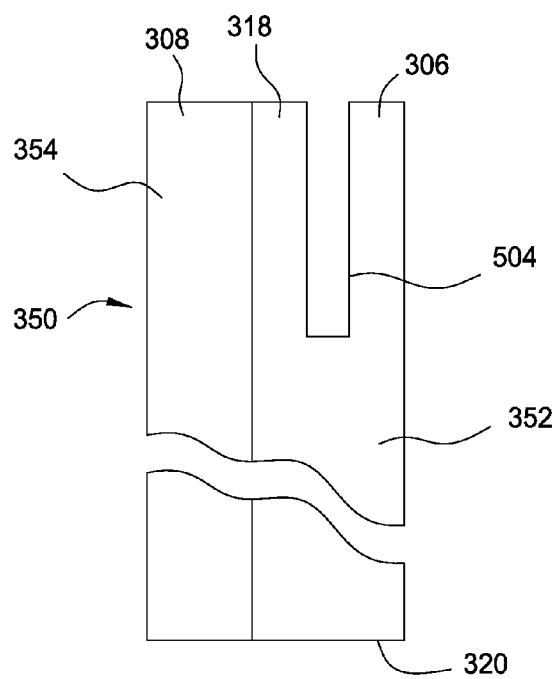
FIG. 5 is a top view of a filter gasket according to one embodiment of the invention.

The gasket strip 350 has a connection portion 352 coupled to a sealing portion 354. The connection portion 352 is elongated between a first end 318 and a second end 320 (shown in FIG. 5). The connection portion 352 is configured to secure the gasket strip 350 to the holding frame 116. In one embodiment, the connection portion 352 has a substantially u-shaped cross-section 360 that includes a first side 302, a second side 304 and a bottom 306. In embodiments wherein the connection portion 352 has a substantially v-shaped cross-section, the first side 302 and the second side 304 may be said to meet at the bottom 306. The connection portion 352 is configured to slide over the flange of the holding frame 116 to position and secure the gasket strip 350 in a predefined position relative to the holding frame 116. The sealing portion 354 extends from the connection portion 352 and is movable to a position beyond the bottom 306 and away from the sides 302, 304 of the u-shaped cross-section 360.

The connection portion 352 is at least partially missing at the first end 318 of the filter gasket 150 so that the sealing portion 354 may overlap the sealing portion 354 attached to the adjacent flange of the holding frame 116. In one embodiment the bottom 306 of the connection portion 352 does not extend all the way to the first end of the connection portion 352. For example, the bottom of the connection portion 352 may be notched or have a slot 504 (shown in FIG. 5) formed therein. The cut-away portion (i.e., slot 504) of the connection portion 352 allows the gasket strip 350 to be slid beyond the flange to which the gasket strip is attached and interleave with the adjacent flange so that neighboring sealing portions 354 may overlap (shown as 704 in FIGS. 7 and 8) once deflected to a substantially flat orientation by the presence of the final filter 110.

While it is contemplated that identical strips 350 having a slot 504 at one end may be utilized to form the filter gasket 150, it is also contemplated that the filter gasket 150 may be formed by two strips 350 having slots 504 at opposite ends used in conjunction with strips 350 having no slots 504, such that the overlap 702 is formed between adjacent strips 350.

The sealing portion 354 is fabricated from a polymeric material. For example, the sealing portion 354 is fabricated from an elastomeric material, such as silicone, butyl rubber, neoprene, EPDM or other suitable elastomer.

Figure 14:
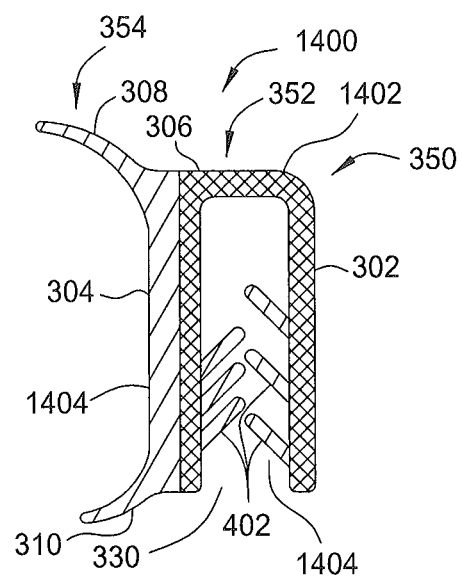
FIG. 14 is a cross-sectional view of a filter gasket according to one embodiment of the invention.

The connection portion 352 may be fabricated from the same or different material as the sealing portion 354. In one embodiment, the connection portion 352 may be made by injection molding or other suitable techniques. In one embodiment, the connection portion 352 is coextruded with the sealing portion 354. For example, the connection portion 352 may be a plastic, such as polyvinyl chloride (PVC), while the sealing portion is an elastomer. For example, as depicted in FIG. 14, in one embodiment a filter gasket 1400 includes a rigid portion 1402 and a resilient portion 1404. The first side 302, the bottom 306 and at least part of the second side 304 facing the slot 300 comprise the rigid portion 1402. The sealing portion 354 and at least part of the second side 304 facing away from the slot 300 comprise the resilient portion 1404. In one embodiment, the rigid portion 1402 and the resilient portion 1404 are coextruded from PVC materials. In one embodiment, the rigid portion 1402 may have a durometer greater than that of the resilient portion 1404. For example, the rigid portion 1404 may have a durometer in the range of between about 50 to about 80 Shore D scale, and the resilient portion 1404 may have a durometer in the range of between about 60 to about 70 Shore A scale. The high durometer of the rigid portion 1402 promotes good retention of the filter gasket 1400 to the holding frame 116, while the resilient portion 1404 that includes the sealing portion 354 provides a reliable and robust filter seal.

Figure 9:
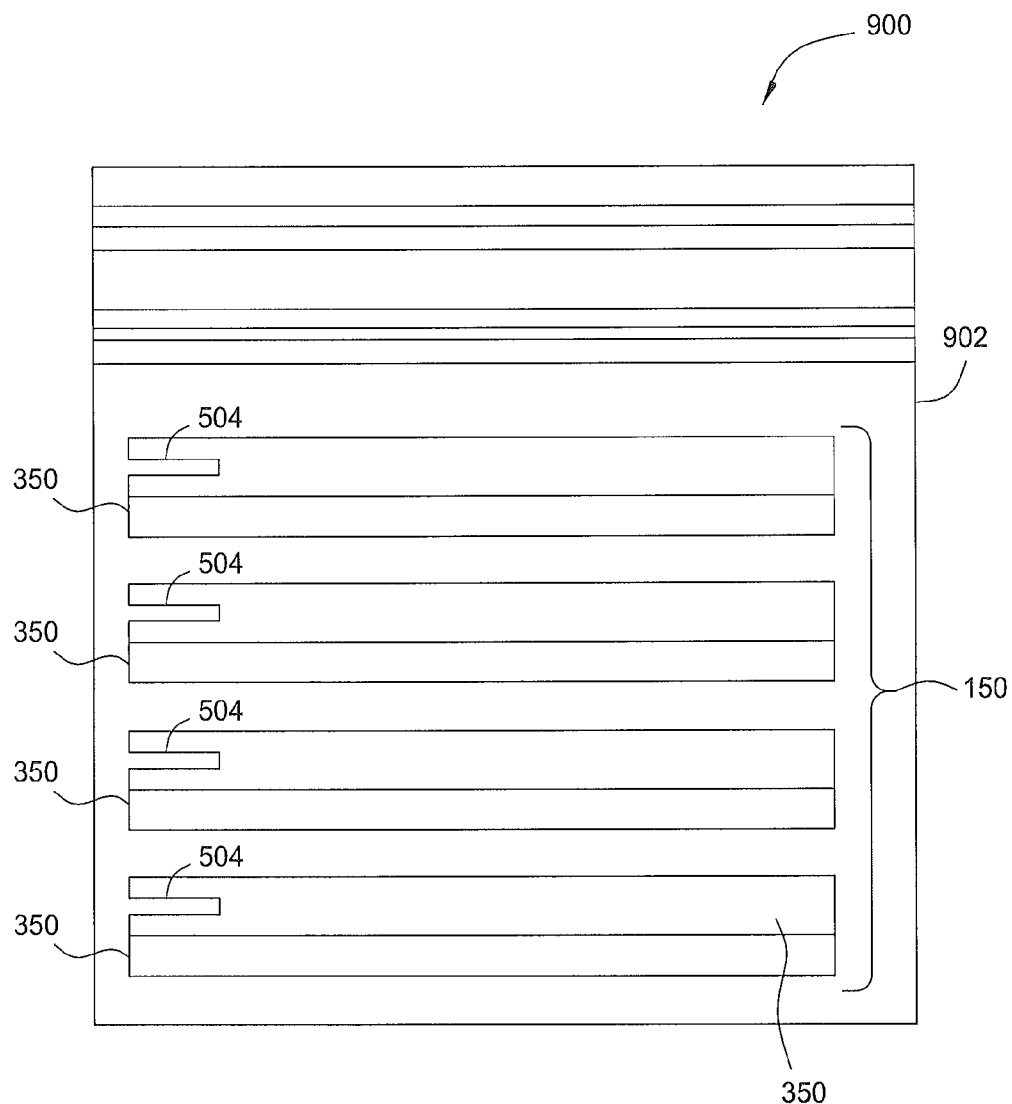
FIG. 9 is a schematic diagram of a gasket kit.
Figure 13:
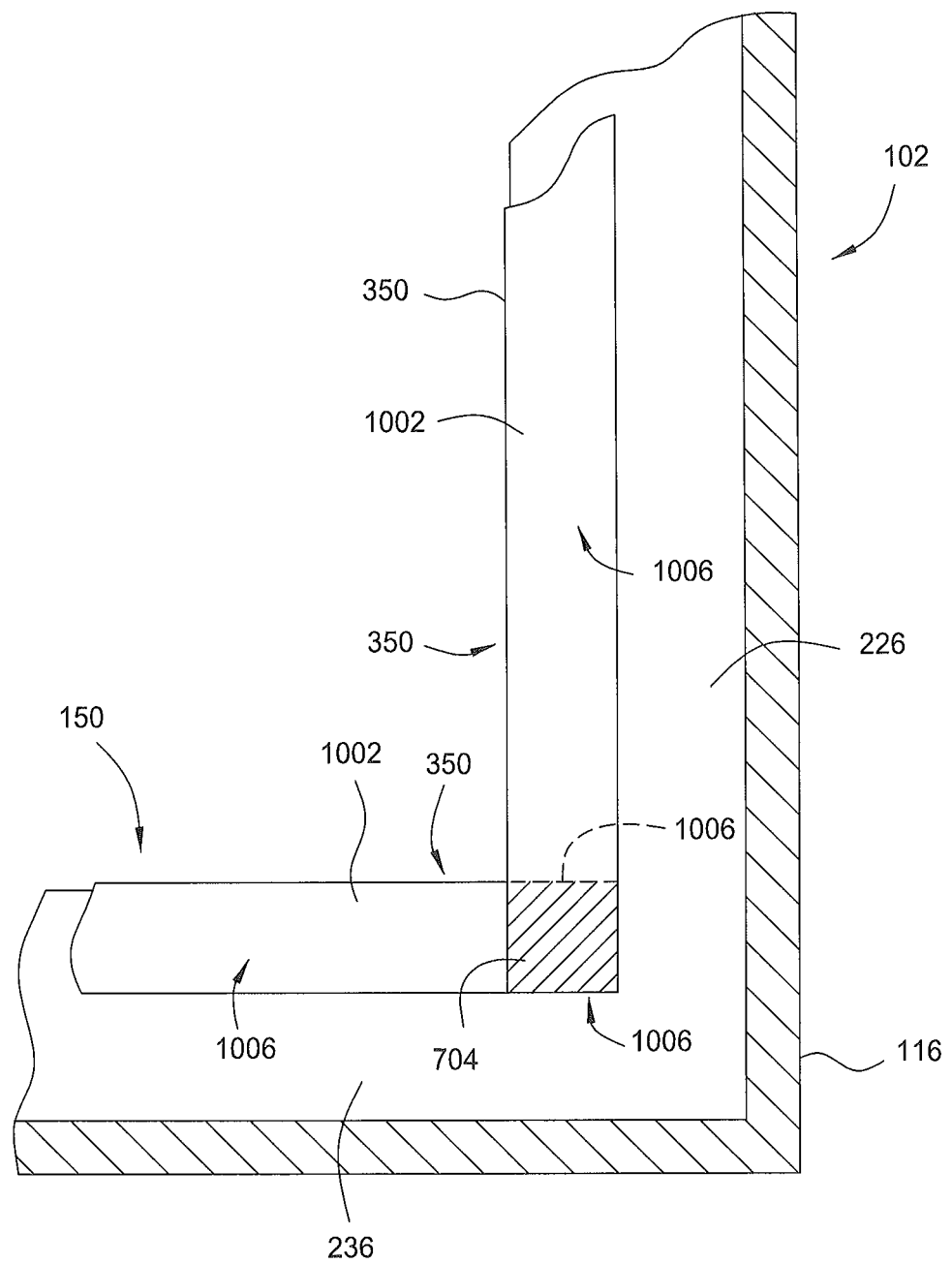
FIG. 13 is an enlarged partial side view of the interaction between adjacent filter gaskets.

As shown in FIG. 9, a number of first elongated gasket strips 350 may be disposed in packaging to form a gasket kit 900 for retro-fitting existing holding frames. In the embodiment depicted in FIG. 9, gasket kit 900 includes four first elongated gasket strips 350 as illustrated in a packaging 902. Packing 902 may be a bag, box or other suitable packing for securing and/or delivery of elongated gasket strips 350.

Referring back to FIG. 3, the first side 302, the second side 304 and the bottom 306 define a flange receiving slot 330 having an opening that runs the length of the gasket strip 350 opposite the bottom 306.

The sealing portion 354 includes at least one flexible sealing element 308 that extends away from the connection portion 352 and into the central aperture 118. The sealing element 308 may be a flap, lip, tube, k-seal structure, cup-seal structure, or other suitable geometric form. In the embodiment depicted in FIG. 3, the sealing element 308 is a flap coupled to the second side 304 of the gasket strip 350. The sealing element 308 extends upwards and outwards from the bottom 306 and second wall 304. In one embodiment, the sealing element 308 has a length extending from the connection portion 352 that is sufficient to extend beyond the bottom 306.

In one embodiment, the filter gasket 150 may optionally include a sealing element 310 that extend away from the connection portion 352. The optional sealing element 310 extends downwards and outwards from the second side 304.

FIG. 4 is another embodiment of a filter gasket 400 that is substantially similar to the filter gasket 150, except wherein the filter gasket 400 includes a plurality of gripping features 402 disposed in the slot 330. The plurality of gripping features 402 are configured to advantageously grip and holding frame 116 when disposed in the slot 330. Similar to as shown with the filter gasket 1400, depicted in FIG. 14, the gripping features 402 may also be fabricated from a resilient material, such as used for the resilient portion 1404. Having resilient gripping features 402 advantageously allows the filter gasket 150, 1400 to be easily engaged with the holding frame 116 with less effort and gasket distortion as compared to a gasket having gripping features fabricated from rigid materials.

Figure 6:
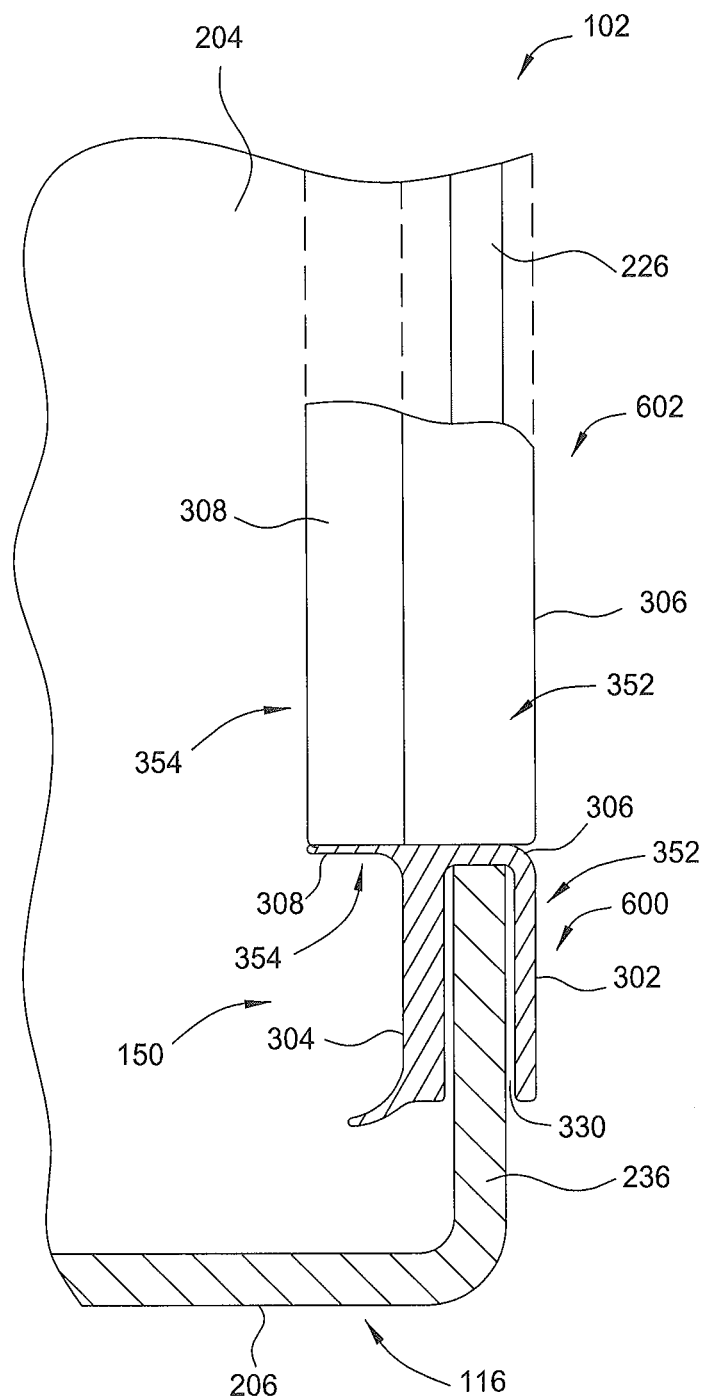
FIG. 6 is an enlarged cross-sectional view of a holding frame assembly that includes one or more filter gaskets according to one embodiment of the invention.

FIG. 6 is an enlarged cross-sectional view of the holding frame assembly 102 that includes one or more filter gaskets according to one embodiment of the invention. In one embodiment, the holding frame 116 has a filter gasket 150 that includes a first filter gasket strip 600 and a second filter gasket strip 602. The strips 600, 602 are constructed as described for the strips 350. The opening 330 of the first filter gasket strip 600 allows the first filter gasket strip 600 to slide on and mate with back flange 236. The second side 304 of the first filter gasket strip 600 faces towards the open edge 232 of the back wall 206. Similarly, the opening 330 of the second filter gasket strip 602 allows the second filter gasket strip 602 to slide on and mate with the back flange 226. A top surface of the second side 304 of the second filter gasket strip 602 faces the side wall 204. While FIG. 6 depicts the second filter gasket strip 602 as only mating with a part of the back flange 226, it is contemplated that the second filter gasket strip 602 mates with the back flange 226 for the entire length of back flange 226.

In one embodiment, the ends of the sealing elements 308 of first gasket strip 600 and the bottom 306 of second gasket strip 602 overlap one another to advantageously form a seal when deflected upon interfacing with the final filter 110. In one embodiment the sealing element 308 of the second filter gasket strip 602 overlaps the sealing element 308 of the first filter gasket strip 600 as shown by reference numeral 704 in FIGS. 7 and 8 when deflected by final filter 110. The edge of sealing element 308 of the first gasket strip 600 will fold over and seal against the edge of the adjacent sealing element 308 of the second gasket strip 602 when the final filter 110 is installed, such that the final filter 110 is substantially sealed to both the gasket strips 600, 602 including across the overlap portion 704. Therefore, the gasket strips 600, 602 seal the holding frame 116 such that there is substantially no bypass between the final filter 110 and the holding frame 116. As the final filter 110 comes in contact with the first gasket strip 600, the final filter 100 deflects the sealing portion 308 of the first gasket strip 600 outwards and on top of the adjacent sealing portion 308 of the second gasket strip 602. Therefore, when the final filter 110 is fully abutted against the holding frame 116, the final filter 100 compresses the sealing portions 308 of the gasket strips 600, 602 including in the overlap area 704 to create the seal.

Figure 7:
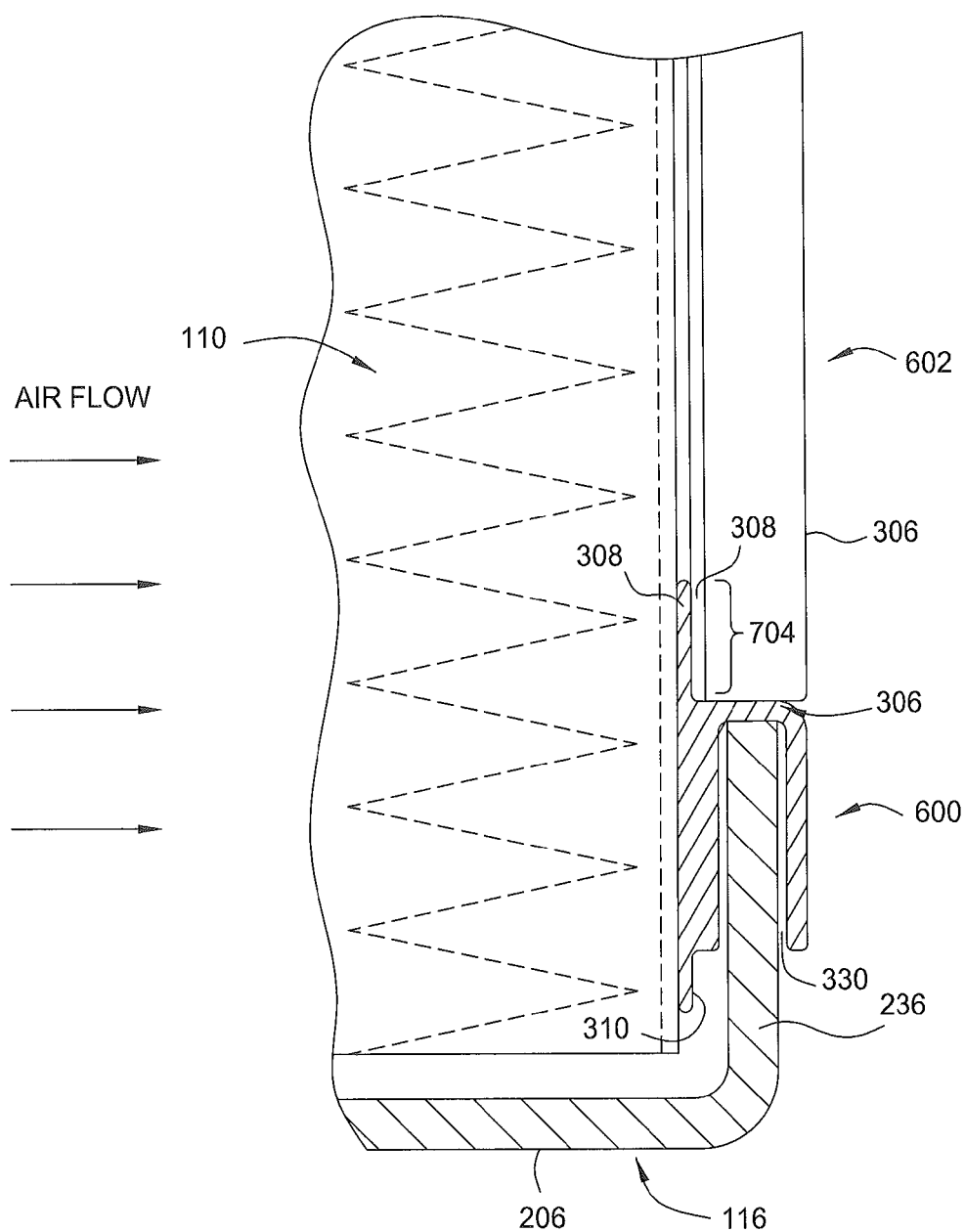
FIG. 7 is an enlarged cross-sectional view of a holding frame assembly that includes one or more filter gaskets and a filter element according to one embodiment of the invention.
Figure 8:
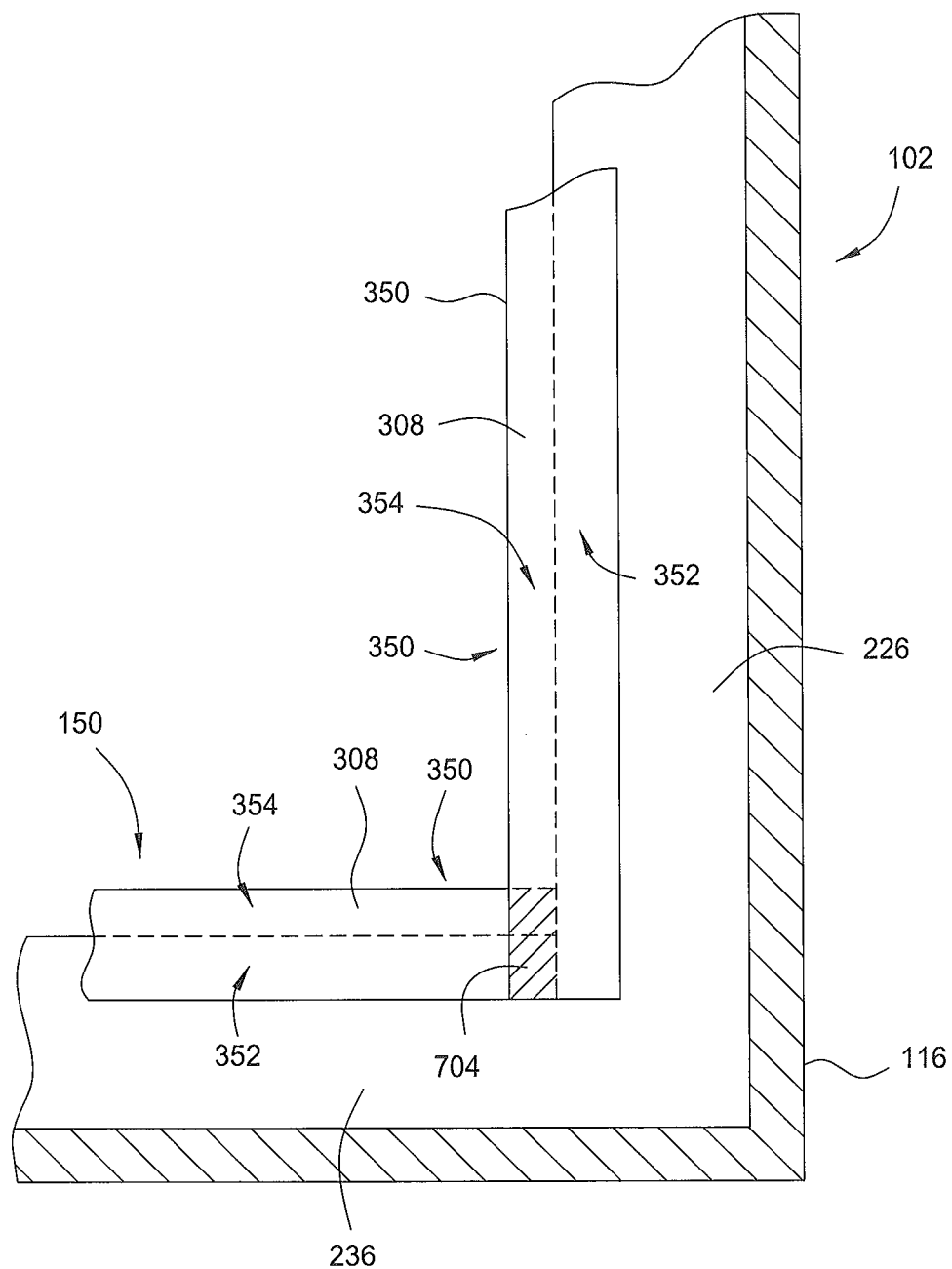
FIG. 8 is an enlarged partial side view of the interaction between adjacent filter gaskets.

FIG. 7 is an enlarged cross-sectional view of holding frame assembly 102 that includes one or more filter gaskets and final filter 110 according to one embodiment of the invention. In an exemplary operation, final filter 110 is installed in accordance with the description above. Final filter 110 abuts and deflects the sealing element 308 and optional second sealing element 310 of first filter gasket strip 600, and the first sealing element 308 and optional second sealing element 310 of second filter gasket strip 602. When final filter 110 compresses and seals against the first and second filter gaskets strips 600, 602, the overlap 704 advantageously creates a seal between the adjacent gasket strips 600, 602, and also between the strips 600, 602 and filter holding frame 116 to minimize bypass between final filter 110 and the holding frame 116. A benefit of using filter gaskets to minimize bypass is that they are cost-effective, easy to replace, and can be utilized to retrofit existing holding frames.

FIGS. 10-13 illustrate another embodiment of a gasket strip 350 that may be utilized to form a filter gasket 150. The gasket strip 350 of FIGS. 10-13 includes an integrated connection portion 1004 and a sealing portion 1006, and maybe packaged in a kit 900 as shown in FIG. 9. Continuing to refer to FIGS. 10-13, the connection portion 1004 includes a profile forms an elongated opening 330 that is configure to receive the flange 236 of the holding frame. The sealing portion 1006 is disposed on the exterior of the connection portion 1004. The sealing portion 1006 may be a portion of the connection portion 1004, or be a flap, lip, K-seal structure, cup-seal structure, or any other geometry suitable for providing a seal with the neighboring gasket strip 350, filter 110 and holding frame 116.

In one embodiment, the sealing portion 1006 extends beyond opposite ends 1010 of the connection portion 1004. In this manner, the portion of the sealing portion 1006 that extends beyond the end 1010 of the connection portion 1004 of one gasket strip 350 forms a sealing overlap 704 with the portion of the sealing portion 1006 that extends beyond the end 1010 of the connection portion 1004 of the neighboring gasket strip 350 to form a gasket strip to gasket strip seal when the filter 110 is pressed against the gasket strips 350.

In one embodiment, shown in FIGS. 10-13, the sealing portion 1006 of a sealing element 1002 does not extend beyond bottom of the connection portion 1004, but rather beyond the end 1010 of the connection portion 1004. Thus, length "B" of the sealing element 1002 is greater than the length "A" of the connection portion 1004, while the length A is less than or equal to the length of the flanges 236 of the holding frame 116 to which the gasket strips 350 are mounted, such that when two adjacent gasket strips 350 are mated the overlap 704 is formed.

While the foregoing is directed to embodiments of the invention, other and further embodiments of the invention may be devised without departing from the basic scope thereof, and the scope thereof is determined by the claims that follow.

What is claimed is:

1. A filter holding frame assembly, comprising:
a filter holding frame having a plurality of walls forming a quadrilateral ring defined around a central aperture, the filter holding frame having a plurality of flanges and adapted to receive a removable filter in the central aperture in a position abutting the flange, each flange coupled to a respective one of the walls and extending into the ring; and
a gasket coupled to each of the flanges, the gasket having a connection portion coupled to a sealing portion, the connection portion having a substantially u-shaped cross-section coupled to the flange, the sealing portion having a first flexible sealing element extending away from the connection portion and into the central aperture.

2. The filter holding frame assembly of claim 1, wherein the substantially u-shaped cross-section includes a first side, a second side and a bottom, the first sealing element extending from the connection portion and movable to a position beyond the bottom of the u-shaped cross-section.

3. The filter holding frame assembly of claim 2, wherein the bottom of the u-shaped cross-section includes a slot configured to allows the gasket to slide beyond the flange towards the neighboring flange.

4. The filter holding frame assembly of claim 2, wherein the first and second side and the bottom of the substantially u-shaped cross-section form a flange receiving slot to couple the substantially u-shaped cross-section with the flange.

5. The filter holding frame assembly of claim 4, wherein the gasket further comprises a plurality of grippers extending from the first side adjacent the flange receiving slot and the second side adjacent the flange receiving slot.

6. The filter holding frame assembly of claim 1, wherein the plurality of flanges includes at least a first flange and a second flange, and wherein the first sealing element of the gasket coupled to the first flange overlaps with the first sealing element of the gasket coupled to the second flange.

7. The filter holding frame assembly of claim 2, wherein the sealing portion further comprises a second sealing element adjacent a second end of the connection portion.

8. A filter gasket comprising:
a connection portion coupled to a sealing portion and forming a unitary strip, the connection portion having a substantially u-shaped cross-section configured to receive a filter holding frame adapted to receive a removable filter, wherein the substantially u-shaped cross-section includes a first side, a second side and a bottom, wherein the bottom of the u-shaped cross-section includes a slot configured to couple the gasket with a neighboring filter holding frame flange, and wherein the sealing portion comprises a first flexible sealing element extending beyond the slot in the bottom of the u-shaped cross-section.

9. The filter gasket of claim 8, wherein the filter gasket further comprises a plurality of grippers extending from the first side adjacent the flange receiving slot and the second side adjacent the flange receiving slot.

10. The filter gasket of claim 9, wherein the sealing portion further comprises a second flexible sealing element adjacent a second end of the connection portion.

11. The filter gasket of claim 8, wherein the filter gasket is fabricated at least partially from a resilient material.

12. The filter gasket of claim 11, wherein the filter gasket is fabricated from an elastomer.

13. The filter gasket of claim 8, wherein the connection portion and the sealing element are coextruded.

14. The filter gasket of claim 8, wherein a length of the sealing portion is greater than a length of the connection portion.

15. The filter gasket of claim 8 further comprising a plurality of grippers extending from the first side adjacent a filter holding frame receiving slot and extending from the second side adjacent the filter holding frame receiving slot.

16. A filter gasket kit comprising:
   four first elongated gasket strips, each first elongated gasket strip comprising:
      a connection portion coupled to a sealing portion and forming a unitary strip, the connection portion having a substantially u-shaped cross-section configured to receive a filter holding frame adapted to receive a removable filter in the central aperture in a position abutting the flange, wherein the substantially u-shaped cross-section includes a first side, a second side and a bottom, wherein the bottom of the u-shaped cross-section includes a slot configured to couple the gasket with a neighboring filter holding frame flange, and wherein the sealing portion comprises a first flexible sealing element extending beyond the slot in the bottom of the u-shaped cross-section.

17. A filter gasket comprising:
   a connection portion coupled to a sealing portion and forming a unitary strip, the connection portion having a substantially u-shaped cross-section configured to receive a filter holding frame adapted to receive a removable filter in the central aperture in a position abutting the flange, wherein the substantially u-shaped cross-section includes a first side, a second side and a bottom, the sealing portion comprises a first flexible sealing element extending outwards from the connection portion, wherein the bottom of the connection portion does not extend to the end of the sealing portion, and wherein sealing portion has a length greater than the first side of the connection portion, and wherein the first side of the connection portion faces the sealing portion.

\* \* \* \* \*